US012312843B2

(12) United States Patent
Takigami

(10) Patent No.: US 12,312,843 B2
(45) Date of Patent: May 27, 2025

(54) VEHICLE DOOR HANDLE STRUCTURE

(71) Applicant: TOYOTA JIDOSHA KABUSHIKI KAISHA, Toyota (JP)

(72) Inventor: Yoshiro Takigami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/106,035

(22) Filed: Feb. 6, 2023

(65) Prior Publication Data

US 2023/0250680 A1 Aug. 10, 2023

(30) Foreign Application Priority Data

Feb. 9, 2022 (JP) ................................. 2022-019076

(51) Int. Cl.
*E05B 85/10* (2014.01)

(52) U.S. Cl.
CPC ............ *E05B 85/10* (2013.01); *E05B 85/103* (2013.01)

(58) Field of Classification Search
CPC ........ E05B 85/10; E05B 85/103; E05B 85/14; E05B 85/18; E05B 81/76; E05B 81/77; E05B 81/78; E05B 81/90; E05B 79/06
See application file for complete search history.

(56) References Cited

U.S. PATENT DOCUMENTS

| | | | | |
|---|---|---|---|---|
| 4,956,943 | A * | 9/1990 | Yamada | E05B 85/16 49/502 |
| 6,698,262 | B2 * | 3/2004 | Wittwer | E05B 77/34 292/DIG. 31 |
| 8,485,573 | B2 * | 7/2013 | Gouhara | E05B 85/18 292/336.3 |
| 9,957,737 | B2 * | 5/2018 | Patel | E05B 85/10 |
| 10,053,893 | B1 * | 8/2018 | Patel | E05B 85/10 |
| 11,396,764 | B2 * | 7/2022 | Blount | E05B 81/76 |
| 11,767,690 | B2 * | 9/2023 | Bendel | E05B 81/78 70/277 |
| 11,834,871 | B2 * | 12/2023 | Ishimoto | E05B 79/12 |
| 2020/0270915 | A1 * | 8/2020 | Yoshino | E05B 81/78 |
| 2020/0362604 | A1 * | 11/2020 | Jarnicki | E05B 81/20 |
| 2021/0396052 | A1 * | 12/2021 | Yamaguchi | E05B 77/34 |
| 2022/0042354 | A1 | 2/2022 | Ishimoto et al. | |

FOREIGN PATENT DOCUMENTS

| | | | | |
|---|---|---|---|---|
| DE | 102006027473 | A1 * | 12/2007 | E05B 79/20 |
| JP | 2008-144534 | A | 6/2008 | |
| JP | 2009-180031 | A | 8/2009 | |
| JP | 2014-111869 | A | 6/2014 | |
| JP | 2014-172572 | A | 9/2014 | |
| JP | 2016-049941 | A | 4/2016 | |
| JP | 2022-029780 | A | 2/2022 | |
| WO | WO-2017129333 | A1 * | 8/2017 | E05B 81/76 |
| WO | 2018/015865 | A1 | 1/2018 | |
| WO | WO-2020144451 | A1 * | 7/2020 | E05B 81/76 |

* cited by examiner

*Primary Examiner* — Kristina R Fulton
*Assistant Examiner* — Noah Horowitz
(74) *Attorney, Agent, or Firm* — Dinsmore & Shohl LLP

(57) ABSTRACT

The vehicle door handle structure includes a door handle disposed above a belt molding on a side door of a vehicle and pulled by a user when the user opens the side door from an outside of the vehicle, and a pocket space disposed behind the door handle to receive fingers of the user, and the door handle is inclined toward the front of the vehicle with respect to the ground contact surface of the vehicle such that an entrance of the pocket space faces diagonally rearward and diagonally upward of the vehicle.

7 Claims, 8 Drawing Sheets

VEHICLE DOOR HANDLE STRUCTURE

CROSS REFERENCE TO RELATED APPLICATION

This application claims priority to Japanese Patent Application No. 2022-019076 filed on Feb. 9, 2022, which is incorporated herein by reference in its entirety including the specification, claims, drawings, and abstract.

TECHNICAL FIELD

The present disclosure discloses a structure of a vehicle door handle that is operated by a user to open a side door of the vehicle from outside the vehicle.

BACKGROUND

Generally, on an outer surface of a side door of the vehicle, the outside door handle operated by the user when the user opens the side door from outside the vehicle is disposed. In the following description, the outside door handle is referred to as a "door handle". Conventionally, the door handle is often disposed in a sheet metal portion below the side window, i.e., the door main body. However, recently, in order to improve the flexibility of the design of the door main body, it has been proposed to arrange the door handle above the door main body, i.e., above the belt molding.

For example, Patent Document 1 discloses a technology in which a door handle is disposed above a belt molding so as to close a rear end portion of a window frame with a door handle. According to this technology, since it is not necessary to arrange the door handle on the door main body below the belt molding, flexibility of design of the door main body is improved.

CITATION LIST

Patent Literature

Patent Document 1: JP 2014-111869 A

Here, in Patent Document 1, in order to open the side door, the user inserts the user's fingers into a pocket space behind the door handle and pulls the door handle toward the user. In the Patent Document 1, the door handle is inclined toward the rear of the vehicle such that the entrance of the pocket space (hereinafter referred to as "pocket entrance") faces diagonally rearward and diagonally downward of the vehicle. In other words, in Patent Document 1, the door handle of the right door is in a posture in which the pocket entrance faces diagonally downward to the left as viewed from the user standing on the outside front of the door, and the door handle of the left door is in a posture in which the pocket entrance faces diagonally downward to the right as viewed from the user standing on the outside front of the door. In this case, it is difficult to operate the door handle with the "normal hand".

More specifically, normally, when operating the door handle, the user stands substantially in front of the door handle. When operating the door handle in this position, the user brings a hand of the user into a first posture or a second posture. The first posture is a posture in which the user's fingers are bent to grasp the door handle in a state in which a palm of the user's hand is directed outward as viewed from the user. The second posture is a posture in which the user's fingers are hooked on the door handle with palm of the user's hand facing the user's body. Hereinafter, the hand in the first posture is referred to as a "normal hand", and the hand in the second posture is referred to as a "reverse hand".

When the door handle of the Patent Document 1 is to be operated with the "normal hand", the door handle of the right door is operated with the right hand, and the handle of the left door is operated with the left hand. Here, when attempting to insert the "normal hand" fingers into the door handle of Patent Document 1, the user has to raise the user's elbow high. For example, in the case of a right side door, in order to insert a right hand fingers, which is a "normal hand", into a pocket entrance facing diagonally downward to the left, the user has to raise the right elbow of the user high. However, since the posture in which the elbow is raised high for the user is an unnatural posture, the door handle of Patent Document 1 has poor operability for the user.

Accordingly, the present disclosure discloses the vehicle door handle structure which is easier for the user to operate.

SUMMARY

A vehicle door handle structure disclosed herein includes an outside door handle disposed above a belt molding on a side door of a vehicle and configured to be pulled toward a user in a state in which fingers of the user are hooked in the outside door handle when the user opens the side door from outside the vehicle and a pocket space disposed behind the outside door handle to receive the fingers of the user, wherein the outside door handle is inclined toward a front of the vehicle with respect to a ground contact surface of the vehicle such that an entrance of the pocket space faces diagonally rearward and diagonally upward of the vehicle.

With this configuration, since the user can grasp the door handle with the "normal hand" without raising the user's elbow high, operability for opening the door is improved.

In this case, the vehicle door handle structure further may include a cup panel at least partially overlapping the outside door handle in a vehicle width direction and a release switch disposed on the outside door handle and configured to be pressed by the fingers of the user to open the side door. In the vehicle door handle structure, a portion of the cup panel facing the outside door handle may be curved inward in the vehicle width direction, thereby forming the pocket space between the cup panel and the outside door handle, the release switch may be configured to be operated by the user to output an electrical signal instructing an electric latch actuator to release a latch of the side door, the outside door handle may be disposed such that an outer surface thereof is substantially parallel to a main surface of the side window, and the release switch may be inclined with respect to the outer surface of the outside door handle such that an operation surface of the release switch is inclined away from the outer surface of the outside door handle as the operation surface of the release switch extends further frontward of the vehicle.

With such a configuration, the user can press the operation surface with the fingers without deeply inserting the fingers of the user into the pocket space. This makes it possible to effectively prevent hand from being sandwiched between the gap between the cup panel and the door handle when the door is opened by the "reverse hand".

Further, the outside door handle may be bent such that a front edge of the outside door handle is positioned further outward than a rear edge of the outside door handle in the vehicle width direction.

With such a configuration, it is possible to secure a wide pocket entrance, and it is possible to effectively prevent hand pinching.

Further, the operation surface of the release switch may comprise an uneven surface to increase friction.

With such a configuration, slippage of the fingers can be effectively prevented.

Further, since the user can recognize the position of the release switch by tactile sense, the latch can be released more appropriately.

Further, the outside door handle may be arranged such that, when the pocket space receives a finger of one hand, another finger of the one hand is out of reach of a peripheral edge of the side door.

With such a configuration, it is possible to prevent pinching of fingers by the door.

According to the technique of the disclosure in this specification, operability in opening the door can be further improved.

BRIEF DESCRIPTION OF DRAWINGS

Embodiments of the present disclosure will be described based on the following figures, wherein.

DESCRIPTION OF EMBODIMENTS

Figure 1:
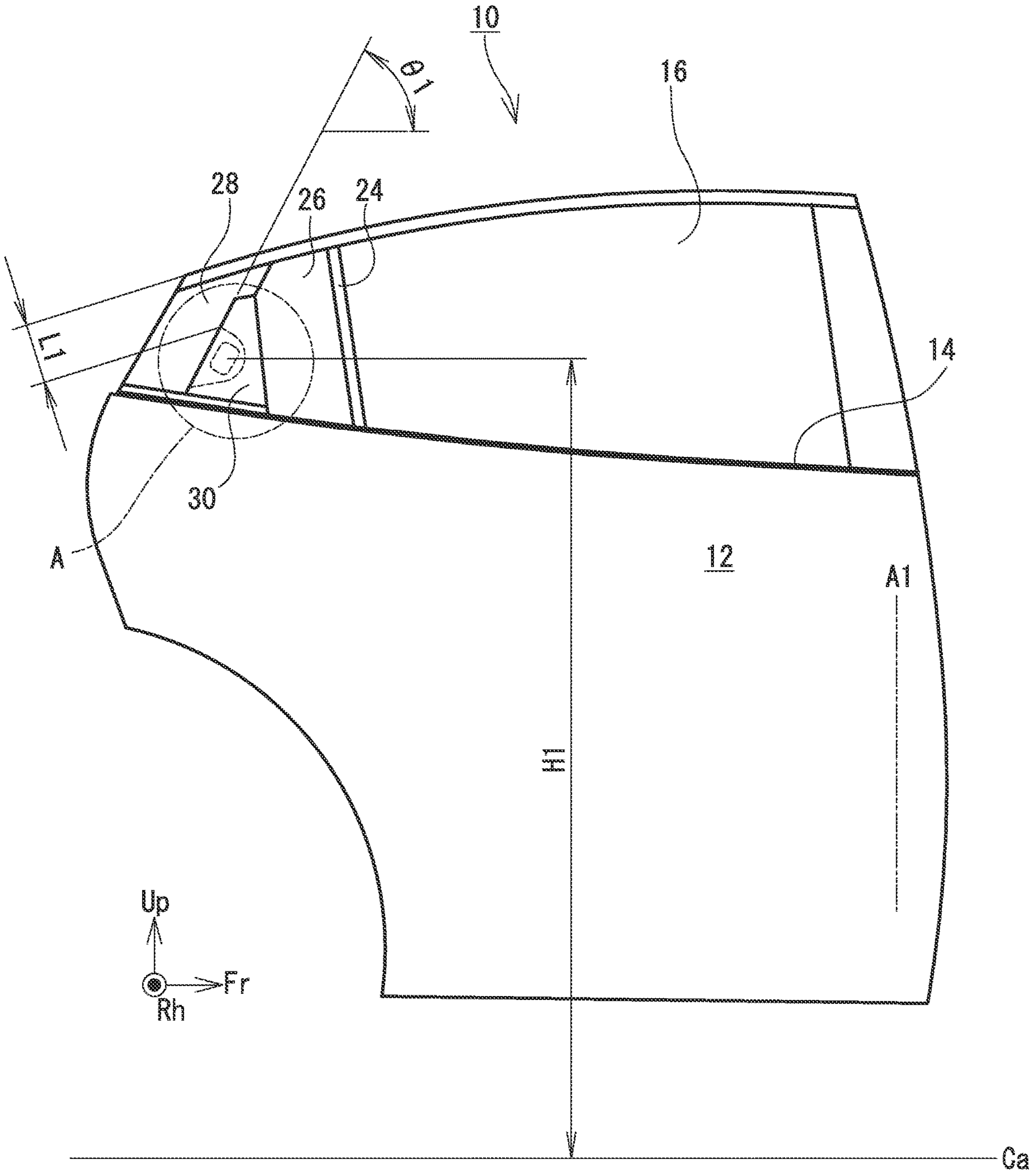
FIG. 1 is a view of a side door of a vehicle as viewed from the outside of the vehicle.
Figure 2:
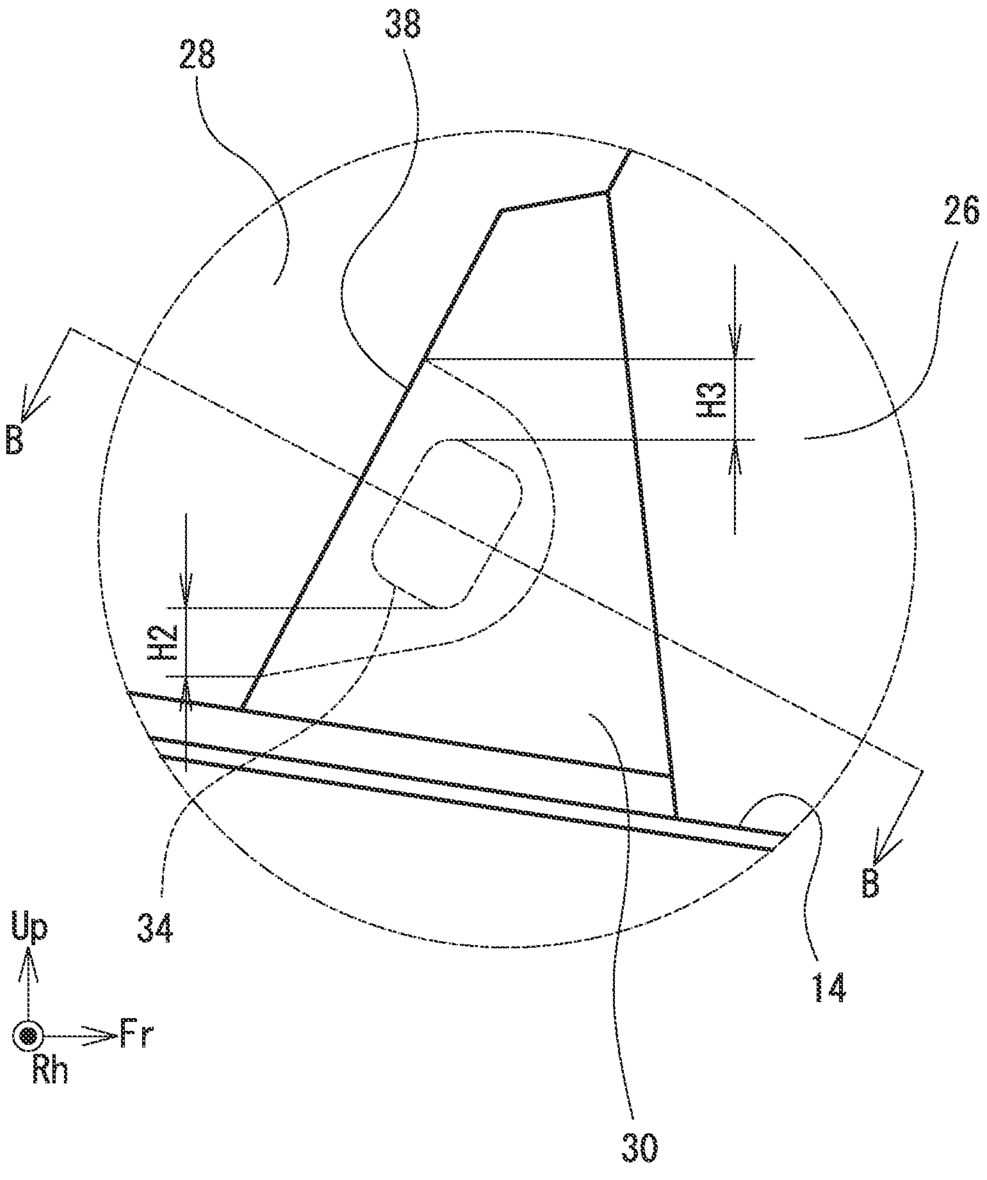
FIG. 2 is an enlarged view of a portion A in FIG. 1.
Figure 3:
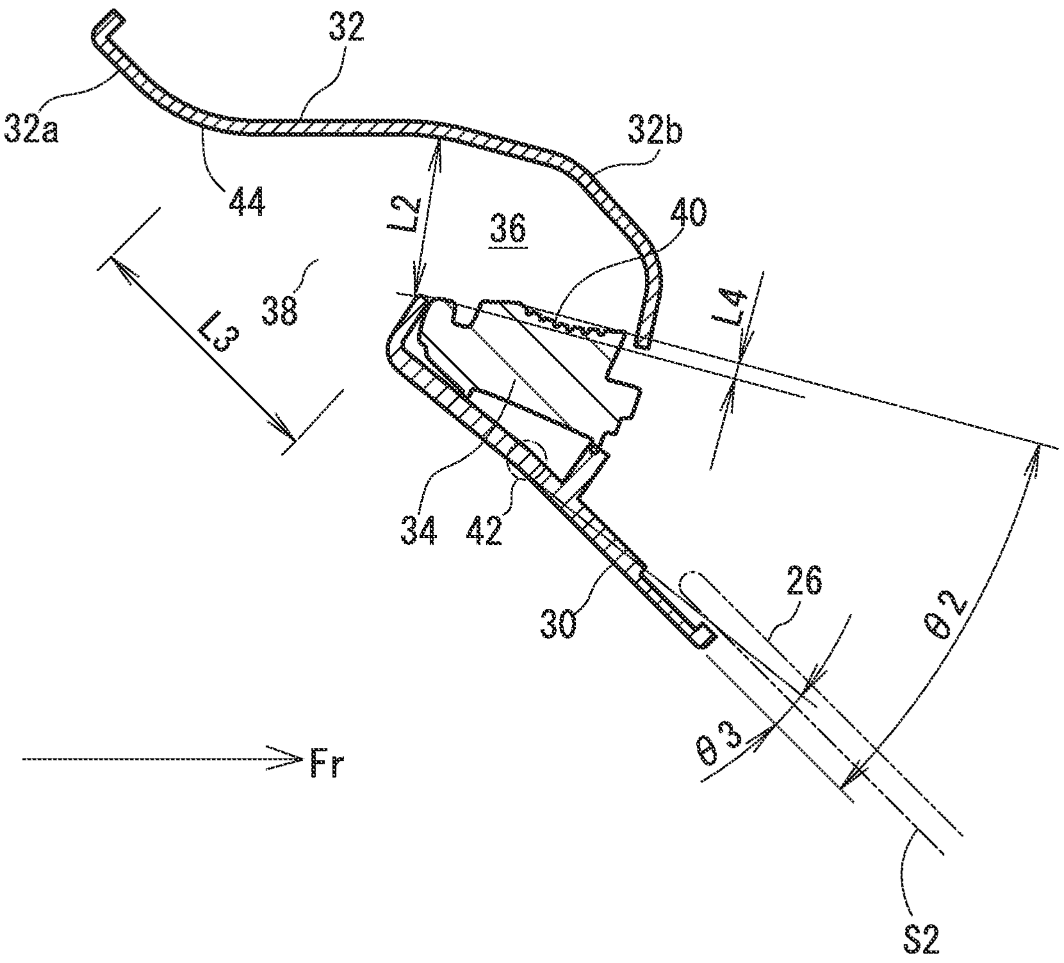
FIG. 3 is a cross-sectional view taken along the line B-B in FIG. 2.

Hereinafter, a vehicle door handle structure will be described with reference to the drawings. FIG. 1 is a view of a side door 10 of a vehicle as viewed from the outside of the vehicle. FIG. 2 is an enlarged view of a portion A in FIG. 1, and FIG. 3 is a cross-sectional view taken along the line B-B in FIG. 2. In the following drawings, "Up", "Fr" and "Rh" refer to the upper side of the vehicle, the front side of the vehicle, and the right side of the vehicle, respectively.

The side door 10 shown in FIG. 1 is a door mounted on a four-door vehicle. In the case of a four-door vehicle, two side doors are arranged side by side in the front-rear direction at the side of the vehicle. The side door 10 in FIG. 1 is a side door disposed on the side of the rear seat. However, the configuration around the door handle 30 described later may be applied to other side doors. The side door 10 disposed on the right side of the vehicle and the side door 10 disposed on the left side of the vehicle are bilaterally symmetrical, and their configurations are substantially the same. Accordingly, in the following description, the side door 10 disposed on the right side will be mainly described as an example.

The side door 10 in this example swings around a hinge axis A1 extending in the vehicle vertical direction at the front end of the side door 10, whereby the side door 10 is opened and closed. The side door 10 is roughly divided up and down with a belt molding 14 extending substantially in the front-rear direction as a boundary. A lower portion of the side door 10 than the belt molding 14 functions as a door main body 12. The door main body 12 is formed by combining metal panel materials. Window glasses 16 and 26 are disposed above the belt molding 14. The elevating window glass 16 is a window glass that can be lifted up and down. The elevating window glass 16 occupies a majority of the upper area of the side door 10. A fixed window glass 26 is disposed rearward of the elevating window glass 16. A border frame 24 extending in the substantially vertical direction is disposed at the border between the fixed window glass 26 and the elevating window glass 16. Further, a decorative panel, i.e., a garnish 28, is provided at the rear of the fixed window glass 26. The garnish 28 is made of black resin.

A door handle 30 is further disposed between the fixed window glass 26 and the garnish 28. The door handle 30 is a member operated by the user to open the side door 10 from outside the vehicle. Conventionally, such the door handle 30 is often disposed on the door main body 12. However, in this example, the door handle 30 is disposed above the belt molding 14. The door handle 30 is disposed adjacent to the rear corner of the fixed window glass 26. By disposing the door handle 30 above the belt molding 14 in this manner, the door main body 12 can be formed into a simple design with few irregularities. This makes it possible to give a refined impression to the observer.

The door handle 30 in this example is disposed above the belt molding 14. Therefore, the installation height H1 of the door handle 30 in this example is higher than the installation height of the conventional door handle, in other words, the installation height of the door handle provided in the door main body 12. More specifically, the installation height H1 of the door handle 30 in this example is generally lower than the shoulder position of the adult who has an average body size and higher than the elbow of the adult who has the arm lowered, although it varies depending on the vehicle type and the body size of the user.

Amore detailed configuration of the door handle 30 will be described with reference to FIGS. 2 and 3. As is apparent from FIG. 3, the door handle 30 is formed of a panel material. The door handle 30 is disposed in a plane substantially parallel to the main surface S2 of the window glass 16, 26. A cup panel 32 is disposed inside the door handle 30 in the vehicle width direction. The cup panel 32 may be a separate member from the garnish 28, or may be formed by extending a part of the garnish 28. A portion of the cup panel 32 facing the door handle 30 curves inward in the vehicle width direction. Thus, a pocket space 36 is formed between the door handle 30 and the cup panel 32. The pocket space 36 is a space for receiving a fingers of a user. Both the door handle 30 and the cup panel 32 are panel members made of resin. When opening the side door 10, the user inserts the fingers of the user into the pocket space 36, and then pulls the door handle 30, and thus the side door 10, toward the user.

Here, in the door handle 30 in this example, the pocket entrance 38 of the pocket space 36 is inclined toward the front of the vehicle such that the pocket entrance 38 faces diagonally rearward and diagonally upward of the vehicle. More specifically, the door handle 30 is installed such that the angle θ1 (see FIG. 1) of the rear end side of the door handle 30 with respect to the ground contact surface Ca of the vehicle is equal to or greater than 50 degrees and equal to or less than 70 degrees. This posture is set in order to facilitate opening of the side door 10 with the "normal hand", which will be described later.

As shown in FIGS. 2 and 3, a release switch 34 is provided on an inner surface of the door handle 30. The release switch 34 is an electric switch configured to be operated by the user in order to output an electric signal instructing to release a latch of the side door 10. When the release signal is output, an electric latch actuator (not shown) is driven to automatically release the latch of the side door 10.

In this example, the release switch 34 is disposed on the inner surface of the door handle 30, i.e., at a position pressed by the fingers when the door is opened. With this configuration, when the side door 10 is to be opened, the user touches the release switch 34 without consciousness. As a result, the user can naturally perform both the operation of pulling the side door 10 toward the user and the operation of releasing the latch, and can smoothly open the side door 10.

As shown in FIG. 3, the release switch 34 has an operation surface 40 configured to be pressed by the user to output a signal. The release switch 34 is inclined with respect to the outer surface of the door handle 30. Specifically, the operation surface 40 extends away from the outer surface of the door handle 30 as the vehicle extends further forward. For example, the angle θ2 of the operation surface 40 with respect to the outer surface of the door handle 30 is greater than or equal to 20 degrees and less than 40 degrees.

The door handle 30 is substantially parallel to the main surface S2. The door handle 30 includes a bent portion 42 slightly bent outward in the vehicle width direction. As a result, the vicinity of the rear end of the door handle 30 is slightly inclined with respect to the main surface S2 (and hence the main surface of the door handle 30). The inclination angle θ3 is, for example, 4 degrees or more.

Figure 4:
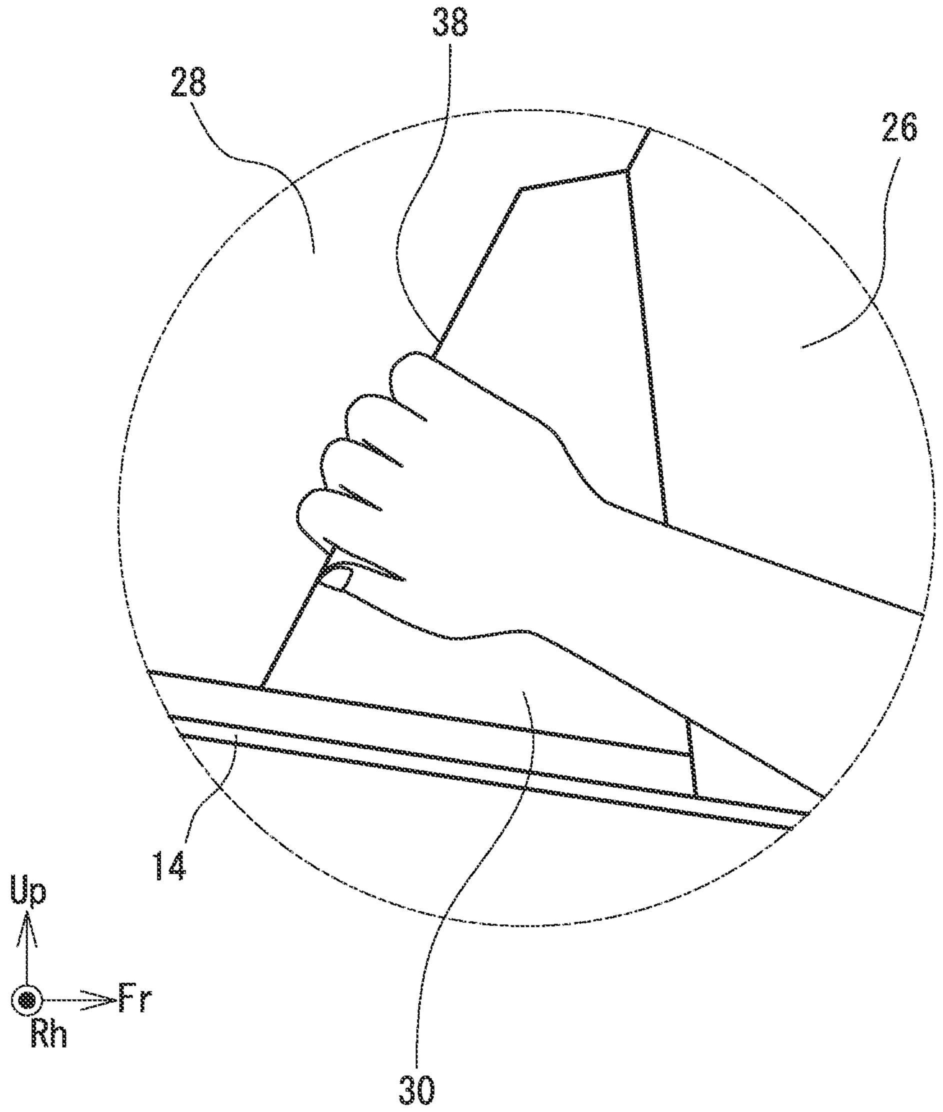
FIG. 4 schematically illustrates a state in which the side door is opened by the "normal hand"
Figure 5:
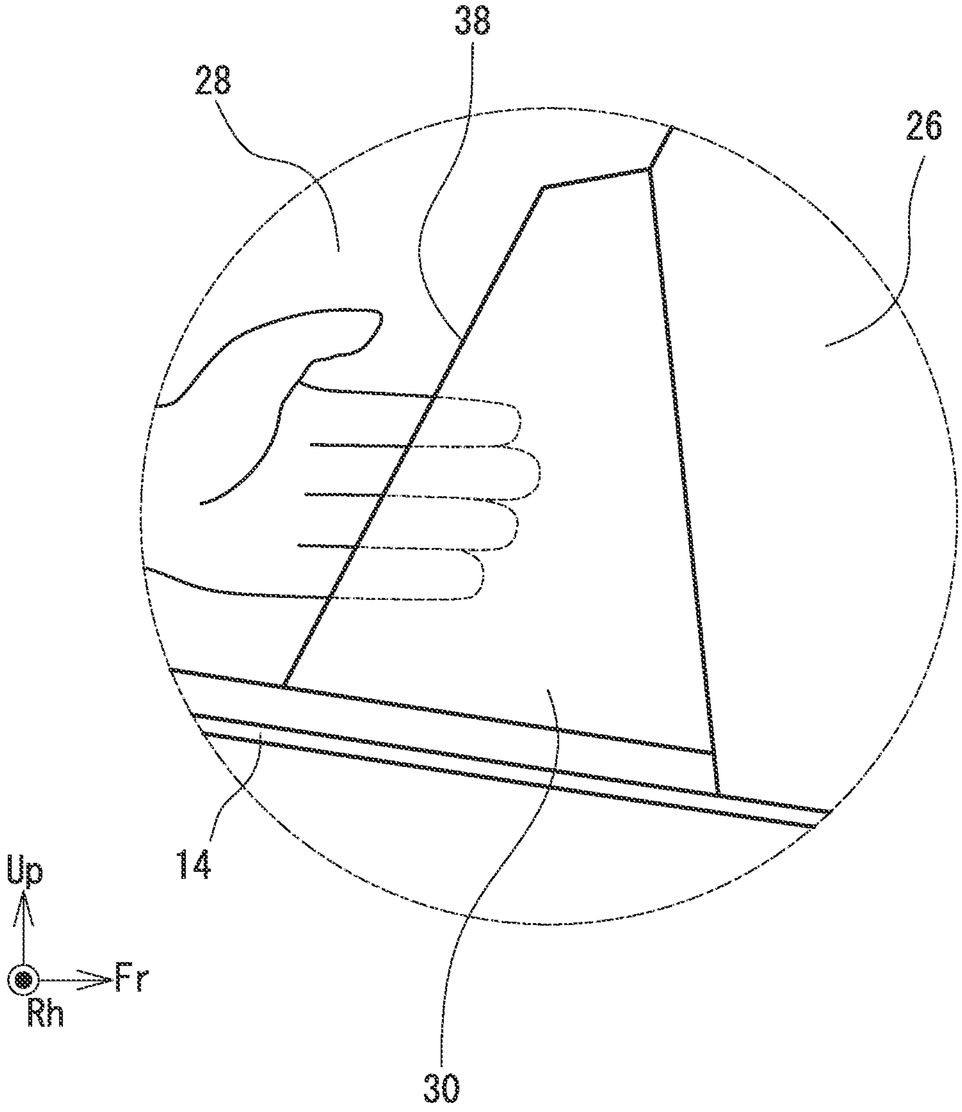
FIG. 5 schematically illustrates a state in which the side door is opened by the "reverse hand"

Next, the reason for this configuration will be described. First, the posture of the hand when opening the side door 10 will be described with reference to FIGS. 4 and 5. As described above, when opening the side door 10 from the outside of the vehicle, the user inserts the user's fingers into the pocket space 36 and pulls the door handle 30 toward the user. At this time, the user sets the hand to "normal hand" or "reverse hand". In the case of the "normal hand", as shown in FIG. 4, the user grasps the door handle 30 by bending four fingers except the thumb in a state in which the palm of the hand faces outward as viewed from the user. Normally, when the door is opened by the "normal hand", the right side door 10 is operated by the right hand, and the left side door 10 is operated by the left hand. In the case of the reverse hand, as shown in FIG. 5, the user inserts four fingers except the thumb into the pocket space 36 with the palm of the user's hand facing the user's body. Normally, when the door is opened by the reverse hand, the left side door 10 is operated by the left hand, and the left side door 10 is operated by the right hand.

Next, in the present example, the reason why the pocket entrance 38 faces diagonally rearward and upward will be described in comparison with other examples. Various problems arise when the pocket entrance 38 faces in directions other than diagonally rearward and diagonally upward directions. For example, when the pocket entrance 38 faces directly upward, a problem arises in that dropped matter enters the pocket space 36 and remains. Further, when the pocket entrance 38 faces forward, there is a problem that foreign matter floating in the air enters the pocket space 36 during traveling of the vehicle. Such a problem can be avoided when the pocket entrance 38 faces directly below. However, when the pocket entrance 38 faces directly below, the user needs to insert the fingers into the pocket space 36 from below. When inserting the fingers into the pocket space 36 at a position higher than the user's elbow from below, the user needs to largely deflect a wrist outward and has to assume a very unnatural posture for the user.

Figure 6:
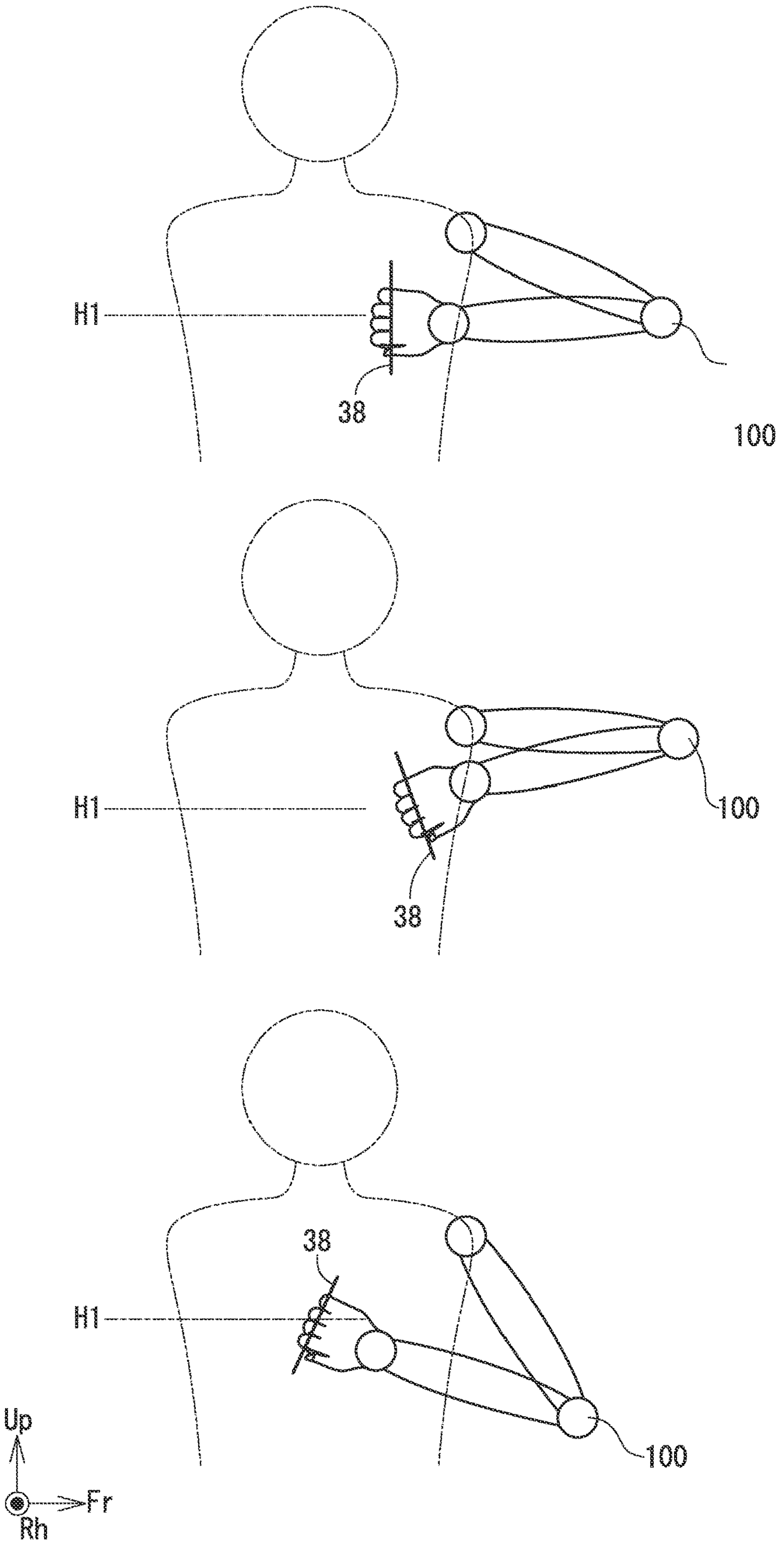
FIG. 6 illustrates a difference in posture of an arm of a user due to a difference in a direction in which a pocket entrance faces.

Therefore, it is conceivable to face the pocket entrance 38 rearward. However, when the pocket entrance 38 faces rearward or diagonally rearward and diagonally downward of the vehicle, it is difficult to open the door by hand in the "normal hand" state. This will be described with reference to FIG. 6. FIG. 6 schematically shows an arm of a user.

When the fingers of "normal hand" are inserted into the pocket entrance 38 facing the rear of the vehicle, the user extends the hand of the user from the wrist in a direction substantially parallel to the longitudinal direction of the vehicle, as shown in the upper part of FIG. 6. Also, in this case, the user must raise the user's elbow 100 to approximately the same height as the pocket entrance 38. Further, when the fingers of the "normal hand" are inserted into the pocket entrance 38 facing diagonally rearward and diagonally downward, the user extends the hand of the user diagonally rearward and diagonally downward from the wrist, as shown in the middle of FIG. 6. Also, in this case, the user must raise the user's elbow 100 higher than the pocket entrance 38. Thus, the posture in which the elbow 100 is raised the same as or higher than the pocket entrance 38 is an unnatural and difficult posture for the user. Therefore, when the pocket entrance 38 faces rearward or diagonally rearward and diagonally downward, the operability for opening the side door 10 is poor.

The lower part of FIG. 6 shows a state in which the fingers of the "normal hand" are inserted into the pocket entrance 38 facing diagonally rearward and diagonally upward. In this case, the user extends the hand of the user diagonally rearward and diagonally upward from the wrist. In this case, the elbow 100 may remain lowered. Therefore, when the pocket entrance 38 faces diagonally rearward and diagonally upward, the user can open the side door 10 in a natural posture with less burden. Accordingly, in the present example, the door handle 30 is inclined toward the front of the vehicle so that the pocket entrance 38 faces diagonally rearward and diagonally upward.

Next, the reason why the release switch 34 is inclined by the angle θ2 with respect to the outer surface of the door handle 30 will be described. As described above, the door handle 30 in this example is easy to operate with the "normal hand". However, depending on a user's preference and the surrounding conditions of the vehicle, the door handle 30 may be operated by the "reverse hand". In particular, when a plurality of vehicles are parked side by side in the vehicle width direction, a space outside the vehicle width direction cannot be sufficiently ensured, and it may be difficult for the user to open the side door 10 while standing on the front surface of the side door 10. In this case, the user is positioned obliquely behind the side door 10 and operates the door handle 30 with the "reverse hand".

Figure 7:
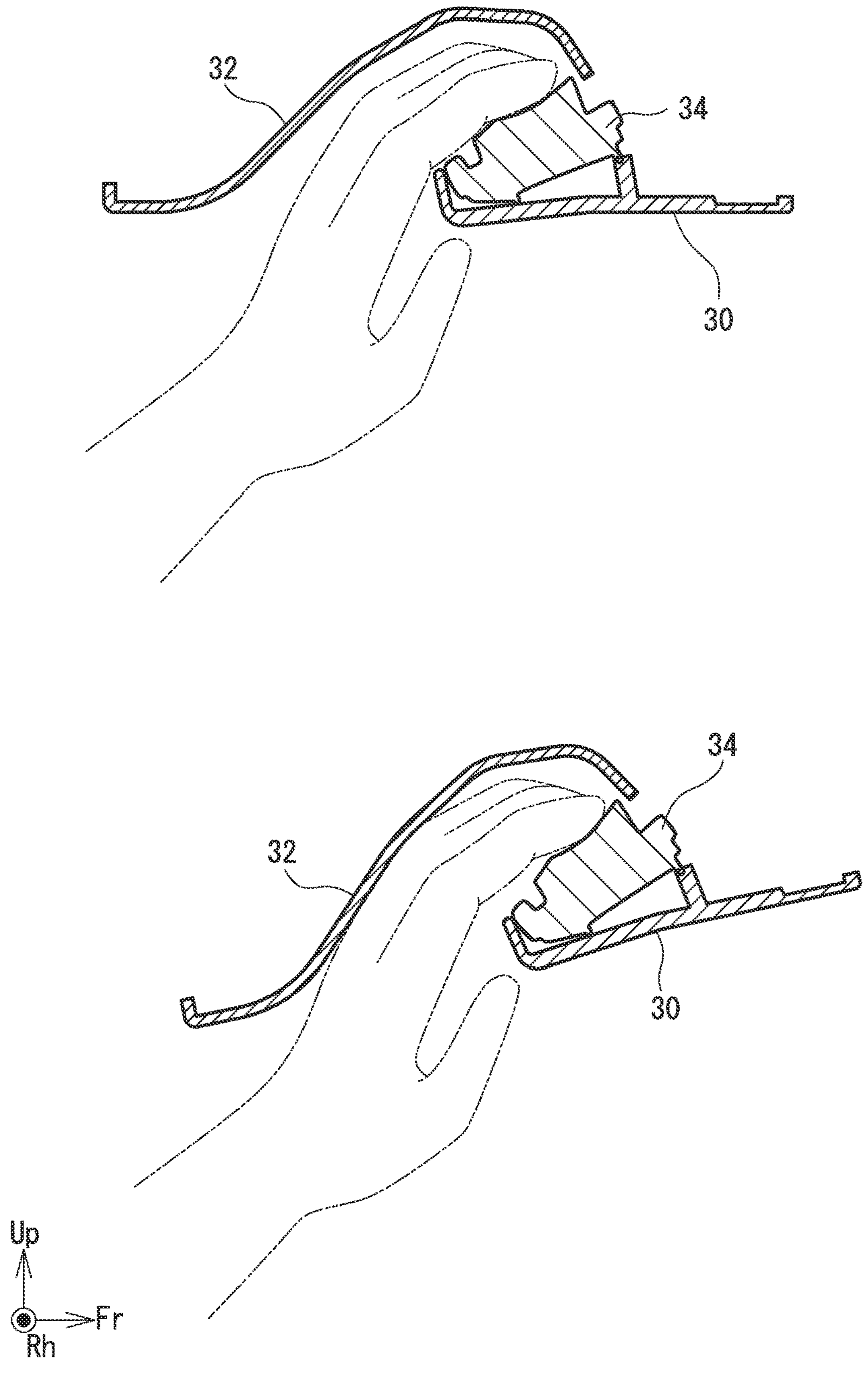
FIG. 7 schematically illustrates a posture of a hand when the door handle in this example is operated by the "reverse hand"
Figure 8:
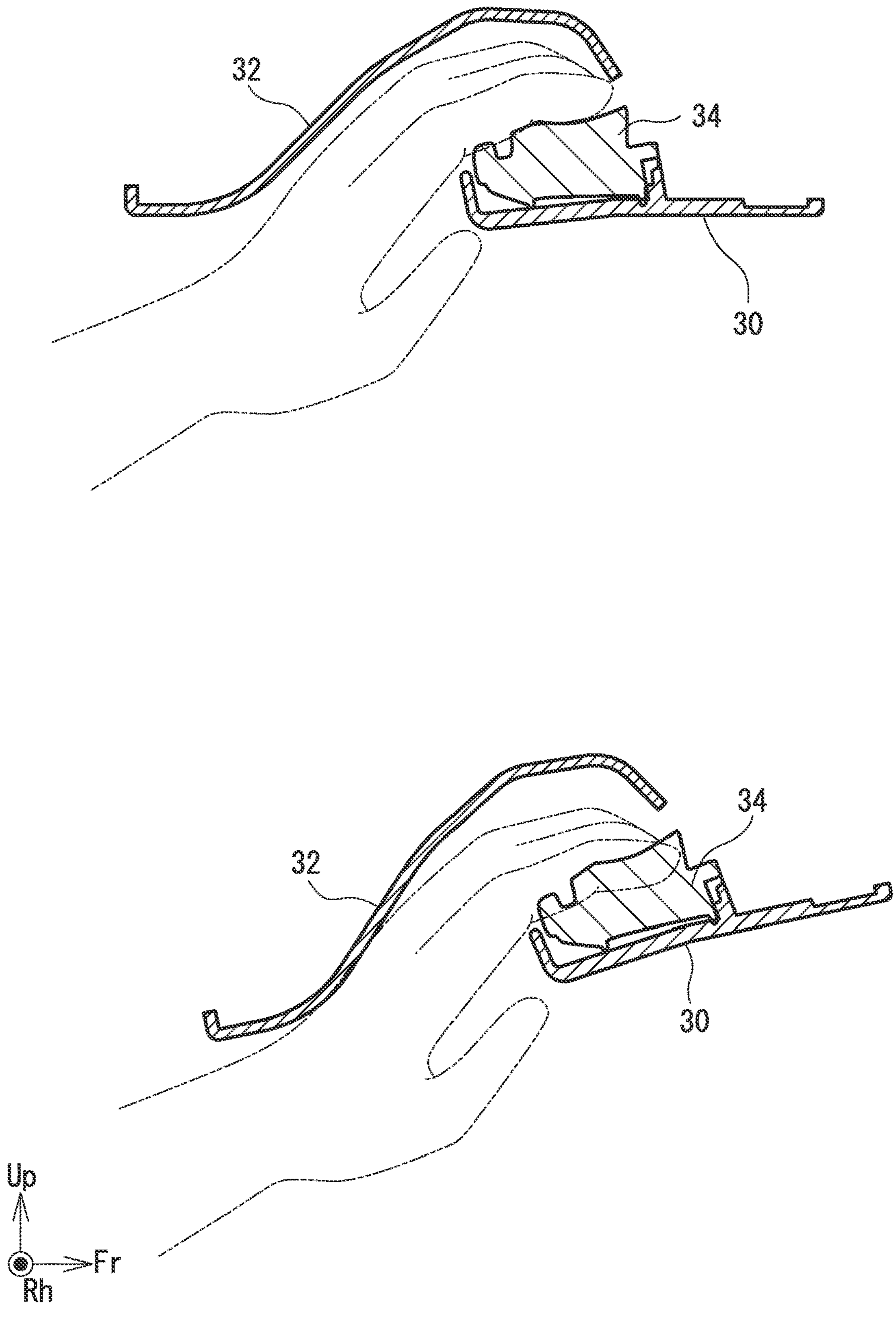
FIG. 8 schematically illustrates a posture of the hand when the door handle in the comparative example is operated by the "reverse hand".

FIGS. 7 and 8 are schematic views showing the posture of the hand when the door handle 30 is operated with the "reverse hand". FIG. 7 shows an operation in the configuration of this example. FIG. 8 shows an operation in a configuration in which the angle θ2 is small. In FIGS. 7 and 8, the upper part shows the state before the opening of the side door 10, and the lower part shows the state when the opening of the side door 10 progresses to some extent.

In the comparative example of FIG. 8, the operation surface 40 of the release switch 34 is substantially parallel to the outer surface of the door handle 30, and the angle θ2 is small. On the other hand, in the example of FIG. 7, the angle θ2 is large. As apparent from comparison between the upper part of FIG. 7 and the upper part of FIG. 8, when the angle θ2 is small (i.e., in the case of FIG. 8), the fingers must be inserted to the deeper side of the pocket space 36 than when the angle θ2 is large (i.e., in the case of FIG. 7).

In this state, it is assumed that the door handle 30 is pulled toward the user and the opening operation of the side door 10 is proceeded. Since the side door 10 is a rotary door, as the opening operation of the side door 10 proceeds, the inclination angle of the side door 10 with respect to the vehicle longitudinal direction increases. As a result, as the opening operation of the side door 10 proceeds, as shown in the lower part of FIG. 7 and the lower part of FIG. 8, the cup panel 32 tends to hit the back of the hand of the user. At this time, in the case where the angle θ2 is small (in the case of the lower stage of FIG. 8), since the fingers are inserted deeply to the deeper side of the pocket space 36, the back of the hand tends to hit the cup panel 32, and the hand tends to be sandwiched between the cup panel 32 and the door handle 30. As a result, the user wishes to unpleasant, or the hand becomes difficult to come out of the pocket space 36 after opening the side door 10.

In order to avoid such a problem, in this example, the release switch 34 is inclined with respect to the outer surface of the door handle 30 so that the angle θ2 is equal to or greater than 20 degrees. With this arrangement, the release switch 34 can be operated without deep insertion of the fingers. Since the fingers is not inserted deeply, even if the inclination of the side door 10 changes with the opening of the side door 10, the hand can be effectively prevented from being pinched by the cup panel 32 and the door handle 30. Further, after opening of the side door 10, the hand can be easily pulled out from the pocket space 36.

Further, in this example, the bent portion 42 is provided near the rear end of the door handle 30. That is, the vicinity of the rear end of the door handle 30 is inclined by the angle θ3 with respect to the main surface S2. With this configuration, the distance L2 (see FIG. 3) between the rear end of the door handle 30 and the cup panel 32 can be increased. This makes it possible to more effectively prevent hands from being caught between the cup panel 32 and the door handle 30.

Incidentally, even if the angle θ2 is increased, the back of the hand tends to hit the cup panel 32 as the side door 10 is opened. At this time, in order to prevent the pointed corner portion from hitting the back of the hand, the exposed portion 32*a* and the protruding portion 32*b* are connected to each other by the R portion 44 which is a gentle curved surface in this example. The exposed portion 32*a* is a portion of the cup panel 32 substantially parallel to the main surface S2 and exposed to the outside. The protruding portion 32*b* is a portion of the cup panel 32 that curves inward in the vehicle width direction. Further, in this example, the operation surface 40 includes an uneven surface for increasing friction. By providing such an uneven surface, slippage of the fingers can be prevented. Further, by providing the concave-convex surface, the user can tactilely determine that the fingers touches the operation surface 40. As a result, by providing the concave-convex surface, the user can operate the release switch 34 more appropriately.

Next, the detailed configuration of the other components will be described. In this example, when the pocket space 36 receives a finger of one hand, the outside door handle is arranged such that another finger of one hand is out of reach of the peripheral edge of the side door 10. More specifically, in FIG. 1, the distance L1 is the shortest distance from the upper end of the pocket space 36 to the peripheral edge of the side door 10. The distance L1 is set to be larger than the distance from the first joint of an index finger of the hand extended straight to the tip of the thumb. This is to prevent the fingers from pinched by the door during operation of the side door 10.

Further, in this example, the pocket space 36 is sized to allow insertion of the hand with a glove. Specifically, a width L3 (see FIG. 3) of the pocket entrance 38 is sufficiently larger than a thickness of the hand with the glove. A shortest distance L2 between the door handle 30 and the cup panel 32 is also sufficiently larger than the thickness of the hand with the glove.

In addition, the release switch 34 is disposed so that, when the antinode of a fingers is brought into contact with the operation surface 40, a claw of the finger does not interfere with a wall of a front end of the cup panel 32. A protruding amount L4 (see FIG. 3) of the operation surface 40 from an inner end portion of the door handle 30 the vehicle width direction is equal to or greater than the operation stroke of the release switch 34.

Further, in this example, a vertical dimension H2 (see FIG. 2) from the lower end of the pocket space 36 to the lower end of the release switch 34 and a vertical dimension H3 from the upper end of the pocket space 36 to the upper end of the release switch 34 are made smaller than a widths of the two fingers (for example, the ring finger and the little finger). With such a configuration, when at least two fingers are inserted in the "reverse hand" state, any one of the fingers always comes into contact with the release switch 34. In other words, with such a configuration, the user can easily press the release switch 34 with the fingers without being aware of the position of the fingers inside the pocket space 36.

The configuration described above is an example, and other configurations may be appropriately changed as long as the door handle 30 is provided above the belt molding 14, and the door handle 30 is inclined toward the front of the vehicle so that the pocket entrance 38 of the pocket space 36 faces diagonally rearward and diagonally upward. For example, in the above description, the electric latch actuator is operated in response to the operation of the release switch 34 to electrically release the latch. However, instead of the electric latch mechanism, a mechanical latch mechanism may be provided. For example, instead of the release switch 34, a lever that swings by pulling the door handle 30 may be provided. In this case, the movement of the lever may be transmitted to the latch via a wire or the like to release the latch. The various dimensions, angles, and shapes described above are merely examples, and may be appropriately changed.

REFERENCE SIGNS LIST

10 side door, 12 door main body, 14 belt molding, 16 elevating window glass, 24 border frame, 26 fixed window glass, 28 garnish, 30 door handle, 32 cup panel, 34 release switch, 36 pocket space, 38 pocket entrance, 40 operation surface, 42 bent portion, 44 R Part, 100 elbow, A1 hinge axis.

The invention claimed is:

1. A vehicle door handle structure, comprising:

an outside door handle disposed above a belt molding on a side door of a vehicle and configured to be pulled toward a user in a state in which fingers of the user are hooked in the outside door handle when the user opens the side door from outside the vehicle;

a pocket space disposed behind the outside door handle and configured to receive the fingers of the user;

a cup panel at least partially overlapping the outside door handle in a vehicle width direction; and a release switch disposed on the outside door handle and configured to be pressed by the fingers of the user to open the side door; wherein:

the outside door handle is inclined toward a front of the vehicle with respect to a ground contact surface of the vehicle such that an entrance of the pocket space faces diagonally rearward and diagonally upward of the vehicle, a portion of the cup panel facing the outside door handle is curved inward in the vehicle width direction, thereby forming the pocket space between the cup panel and the outside door handle, the release switch is configured to be operated by the user to output an electrical signal instructing an electric latch actuator to release a latch of the side door, the outside door handle is disposed such that an outer surface thereof is substantially parallel to a main surface of a side window, the release switch is inclined with respect to the outer surface of the outside door handle such that an operation surface of the release switch is inclined away from the outer surface of the outside door handle as the operation surface of the release switch extends further frontward of the vehicle, and the operation surface has a concave surface, the concave surface has a rear end in a front-rear direction of the vehicle and a front end in the front-rear direction of the vehicle, the rear of the concave surface of the operation surface being closer to the outer surface of the door handle than the front end of the concave surface of the operation surface.

2. The vehicle door handle structure according to claim 1, wherein:

the outside door handle has a bent portion;

the outside door handle has a first surface that is parallel to the main surface in a portion of the outside door handle further frontward of the vehicle with respect to the bent portion; and the outside door handle has a second surface that is inclined with respect to the main surface and extends further outward in the vehicle width direction with respect to the main surface in a portion of the outside door handle further rearward of the vehicle with respect to the bent portion.

3. The vehicle door handle structure according to claim 1, wherein the operation surface of the release switch comprises an uneven surface to increase friction.

4. The vehicle door handle structure according to claim 1, wherein the outside door handle is arranged such that, when the pocket space receives a finger of one hand, another finger of the one hand is out of reach of a peripheral edge of the side door.

5. A vehicle door handle structure, comprising:

an outside door handle disposed above a belt molding on a side door of a vehicle and configured to be pulled toward a user in a state in which fingers of the user are hooked in the outside door handle when the user opens the side door from outside the vehicle;

a pocket space disposed behind the outside door handle to receive the fingers of the user;

a cup panel at least partially overlapping the outside door handle in a vehicle width direction; and a release switch disposed on the outside door handle and configured to be pressed by the fingers of the user to open the side door; wherein:

the outside door handle is inclined toward a front of the vehicle with respect to a ground contact surface of the vehicle such that an entrance of the pocket space faces diagonally rearward and diagonally upward of the vehicle, a portion of the cup panel facing the outside door handle is curved inward in the vehicle width direction, thereby forming the pocket space between the cup panel and the outside door handle, the release switch is configured to be operated by the user to output an electrical signal instructing an electric latch actuator to release a latch of the side door, the outside door handle is disposed such that an outer surface thereof is substantially parallel to a main surface of a side window, the release switch is inclined with respect to the outer surface of the outside door handle such that an operation surface of the release switch is inclined away from the outer surface of the outside door handle as the operation surface of the release switch extends further frontward of the vehicle, the outside door handle has a bent portion, the outside door handle has a first surface that is parallel to the main surface in a portion of the outside door handle further frontward of the vehicle with respect to the bent portion, and the outside door handle has a second surface that is inclined with respect to the main surface and extends further outward in the vehicle width direction with respect to the main surface in a portion of the outside door handle further rearward of the vehicle with respect to the bent portion.

6. The vehicle door handle structure according to claim 5, wherein the operation surface of the release switch comprises an uneven surface to increase friction.

7. The vehicle door handle structure according to claim 5, wherein the outside door handle is arranged such that, when the pocket space receives a finger of one hand, another finger of the one hand is out of reach of a peripheral edge of the side door.

* * * * *